Oct. 10, 1933.    O. A. ROSS    1,929,519
SYSTEM FOR PRODUCING SOUND MOTION PICTURES
Filed Oct. 8, 1928
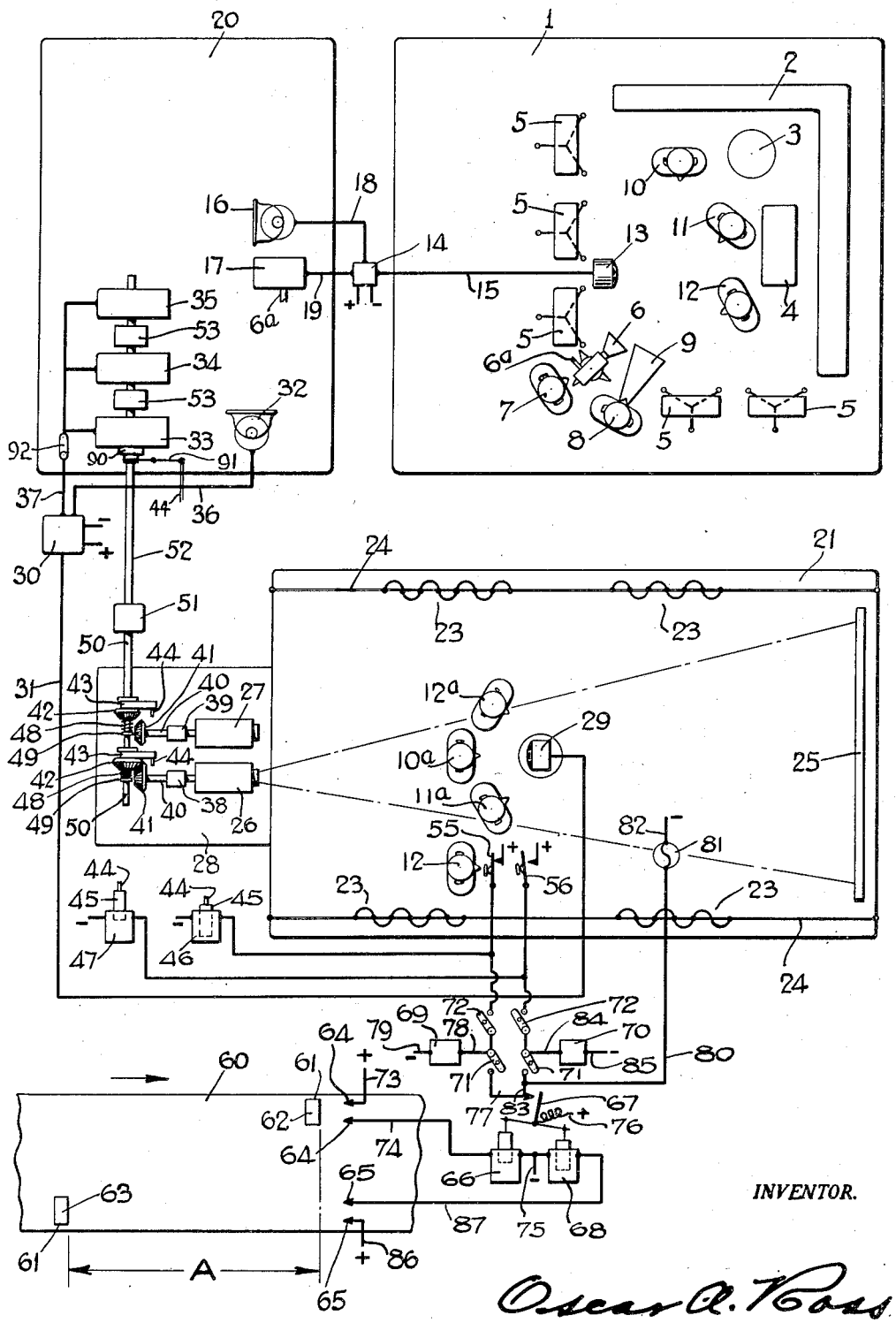
INVENTOR.
Oscar A. Ross

UNITED STATES PATENT OFFICE 1,929,519

SYSTEM FOR PRODUCING SOUND MOTION PICTURES

Oscar A. Ross, New York, N. Y.

Application October 8, 1928. Serial No. 311,127

4 Claims. (Cl. 88—16.2)

This invention relates to what is more generally known as "talking motion pictures" and more particularly to the production of motion picture productions in which action and sound are synchronized for reproduction thereof for exhibition purposes.

In recording "talking motion pictures" it is now customary to initially photographically record the final sound record simultaneously with the action record. Such recording requires that the sound and action shall be both simultaneously ideal if a satisfactory initial record for reproduction is to be obtained.

This invention differs from the aforesaid practice in that, although when photographically recording a scene, the sound may be primarily photographically recorded simultaneously with the action, this primary sound record is not finally presented with the action record for exhibition purposes. As the aforesaid primary sound record in this invention is not of major importance for use as a presentation or exhibition, when photographically recording a scene the microphone may be placed at more convenient locations and only occasionally moved, if at all. Furthermore, no need for removing or reducing unusual noises, or providing acoustic linings of the studios, or sets, is required; in fact, the recording of the production may progress much in the same manner as before "talking motion pictures" became the vogue. Also in the aforesaid primary sound record may be recorded the director's voice instructing the actors, as well as the actors' voices, or other action sounds, whereby the producers may have more knowledge of the production activities.

After one or more scenes of a production have been filmed, or photographically recorded, positive prints are made and thereafter the action only is projected onto a screen in an acoustically proportioned room in the actors presence, preferably each single scene, or a position thereof, being repeated successively, the actors repeating their lines before a microphone simultaneously with the presentation of the action projected onto the screen. After the actors have rehearsed their lines in synchronization with the action projected onto the screen and the recording circuits have been properly tuned from a monitor horn in the monitor room, a director, or one of the actors, effects operation of certain recording apparatus as the lines are again repeated, in this manner effecting the recording thereof in synchronism with the action projected onto the screen, and if desired, several sound recordings may be repeated whereby a preferred selection of sound record may be made after the sound record films are developed and reproduced.

This invention also comprehends the simultaneous recording of the sound record at varying speeds whereby, if desired, a selection of one of the variable speed records may be chosen to more uniformly synchronize with the action record to which it is to be finally accompanied at normal speed for presentation as a "talking motion picture."

Other objects and advantages will appear as the description of the invention progresses, and the novel feature of the invention will be pointed out in the appended claims.

This invention consists in the novel construction and arrangement of parts hereinafter described, delineated in the accompanying drawing, and particularly pointed out in that portion of this instrument wherein patentable novelty is claimed for certain and peculiar features of the system, it being understood that, within the scope of what hereinafter thus is claimed, divers changes in the form, proportions, size and minor details of the structure may be made without departing from the spirit of, or sacrificing any of the details of the invention.

In describing the invention in detail, reference is had to the accompanying drawing, wherein I have illustrated embodiments of my invention, and, wherein like characters of reference, designate corresponding parts throughout the several views, and in which:—

The figure represents a plan view of a studio lot, or studio building, in the action studio room 1, in which is located a set 2, having properties 3 and 4, illuminated by broads 5—5, and/or such other illuminating units as may be required, the action being recorded by motion picture camera 6, operated by cinematographer 7, the director 8 having megaphone 9 directing actors 10, 11 and 12 speaking before microphone 13 connected to control or gain unit 14 by cable 15, said unit also supplying appropriate sound impulses to monitor horn 16 and sound recording camera 17, connected thereto by cables 18 and 19, said horn and camera being located in monitor room 20, and said camera being driven in synchronism with motion picture camera 6 by coupling, as 6a.

The acoustic characteristics of recording room 21 is adapted to be varied by movement of draperies, or sound vibration absorbing members 23—23 supported by rods 24—24 whereby the reverberation characteristics therein may be adjustably proportioned for the particular sounds to be recorded in said recording room. Also supported in said room is motion picture screen 25 arranged to receive projected images from projectors 26 or 27 in projection room 28 formed preferably as an extension of recording room 21. Recording room 21 is also furnished with suitable seats (not shown) upon which actors 10a, 11a and 12a may be seated before microphone 29 connected to control, or gain unit 30 by conductor cable 31, the amplified sound impulses from said microphone being conducted to monitor horn 32 and recording cameras 33, 34 and 35 by cables 36 and 37.

Projectors 26 and 27 are driven by suitable motors 38 and 39, said motors having extension shafts 40—40 supporting bevel gears 41—41. Slidable on shaft 50 but restrained to rotate therewith, are bevel gears 42—42 arranged to be axially moved by forked members 43—43 actuated by rods 44—44 secured to magnet cores 45—45 of magnets 46 and 47.

Shafts 50 and 52 are preferably connected by a mechanical filter 51 whereby shaft 52 driving sound cameras 33, 34 and 35 is free from any vibration which might be transmitted by shaft 50.

Arranged between each sound recording camera, as 33, 34 and 35 is a variable speed transmission 53 whereby camera 34 may be driven at a higher or lower rate of speed than camera 33 and likewise camera 35 may be similarly operated with respect to cameras 33 and 34.

For the purpose of recording incidental sounds, for example, accompanying music, the ringing of a telephone bell, etc., the positive film 60 projected by projectors 26 or 27 may be supplied with control stations, as 61, shown as conductor strips 62 and 63 arranged to momentarily bridge contacts, as 64—64 and 65—65, suitably supported in said projectors, strip 62 acting to establish a circuit to starting magnet 66 arranged to close contact lever 67 when energized, and strip 63 acting to establish a circuit to canceling magnet 68 arranged to open said lever.

Contact lever 67 is arranged to supply energy to sound producing devices 69 and 70, said circuits being controlled by manually, or remote controlled switches 71—71 and 72—72, as more fully hereinafter described.

When a scene of a production, as set 2, is to be photographically recorded by camera 6 for purposes of producing "talking motion pictures" by the herein described improved system, the action record is photographically recorded in action studio room 1 in much the same manner as when recording for silent pictures. However, the actors, as 10, 11 and 12, if present, are required to repeat their lines in proper sequence in the same manner as if the sound record were to be finally recorded for reproduced presentation.

It is preferred to primarily record the sound records produced on said set by a microphone, as 13, whereby a record of all sounds, including instructions by a director, as 8, may likewise be recorded by sound recording camera 17.

After the action and primary sound record of one or more scenes have been completed, positive prints thereof are produced in known manner, whereafter said positive prints, comprising preferably only one scene, or a portion thereof, is projected onto screen 25 by projectors 26 or 27. If desired several strips of film each having the same scene may be joined together, or said projectors may be of a known form wherein the same scene is successively projected onto said screen by a looped film having a single or series of scenes thereon.

During said successive projection of said scene, the actors originally producing the action, or if desired, some person or persons possessing more appropriate speaking voices, are seated before microphone 29 and are required to repeat their lines as the action is projected on screen 25. After the director 12 has decided that said actors have acquired adequate synchronization of their lines with the projected action on screen 25 he may depress contact lever 55 whereby an obvious circuit is established to magnet 46, whereupon magnet core 45 thereof is drawn downward thereby actuating rod 44, forked member 43 and gear 42, in this manner effecting a meshing of gears 41 and 42 driven by motor 38 of projector 26, as shown. Simultaneously cameras 33, 34 and 35 are placed in operation and the lines repeated by actors 10a, 11a and/or 12a will be recorded by said cameras in synchronism with the action being projected on screen 25 by projector 26.

It is to be noted that while the actors are rehearsing to synchronize their voices with the action projected on screen 25, their voices are also produced in monitor horn 32, whereby the operator in monitor room 20 may appropriately tune the sound recording circuits prior to final recording.

It is to be observed that the sound recording director as 12, may depress contact levers 55 or 56 without knowledge thereof by the actors and, therefore, self-consciousness on their part may be partially if not wholly eliminated. Also that said director may make any number of sound records whereby the most desirable complete record or the most desirable sections of each complete record may be selected for the reproducing of the final record.

After the sound records have been recorded on the negative films in cameras 33, 34 and 35, they are developed and positive prints are preferably produced therefrom, whereafter said positive sound prints and the action print, to which said sound record was synchronized, are projected simultaneously and at synchronous speed to note the degree of synchronization, therebetween, the positive sound record films having ideal synchronization being selected as the final record for reproduction.

Thereafter the corresponding selected negative film sections are suitably spliced together to form the final negative from which a duplicate non-spliced negative is made for final printing of positive films, which may comprise a single film having a combined sound and action track thereon of known form, or separate films, one having the sound tracks only and the other the action track only.

It is to be understood that when the final sound and action records are to be photographically reproduced on a single film the speed of the films in projectors 26 or 27 and sound recording camera 33 is identical. However, if said records are to be photographically recorded on separated films the speed of movement of the film in recording camera 33 may be greater and in the same proportion as positive films reproduced therefrom are proportionately more rapidly moved with respect to the action film when said separated films are projected for exhibition purposes.

Assume that in addition to recording the actors' voices, incidental sounds are to be intermittently recorded therewith and that the film as 60 has been supplied with suitable stations as 61—61 for the control of sound producing devices, as 69 and/or 70. If the intermittent incidental sound is to be reproduced by device 69 the left-hand switch 71 is closed and as strip 62 bridges contacts 64—64 a circuit to starting magnet 66 is established as follows:—from positive energy wire 73, contact 64, strip 62, contact 64, wire 74, magnet 66 and thence to negative energy through wire 75. As the circuit is established, contact lever 67 is drawn to the left thereby closing a circuit to sound producing device 69 as follows:—from positive energy wire 77, switch 71 in closed position, wire 78 to device 69 and thence to negative energy through wire 79. Simultaneously a circuit is established to indicator 81 through wire 80. If device 70 was to have been operated independently or jointly with device 69, switch 71 to the right would have been closed singly or jointly with switch 71 to the left and the circuit to device 70 would have been completed through wires 83, 84 and 85.

At the proper point in the action said incidental sound is to be cancelled, strip 63 will bridge contacts 65—65 as film 60 is advanced, whereupon a circuit to cancelling magnet 68 is established as follows:—from positive energy, wire 86, contact 65, strip 63, contact 65, wire 87, magnet 68 and thence to negative energy through wire 75. As this circuit is established contact lever 67 is moved to the right, thereby opening the circuit to device 69, or both devices 69 and 70, if both switches 71—71 are closed.

Sound producing devices 69 and 70 may be controlled independently of control stations 61—61 by closing switches 72—72 and in this manner the director, as 12, may depress levers 55 or 56 at the beginning of the scene and a sound device as 69 or 70 may be caused to produce incidental music in accompaniment to the actors voices.

It is to be understood that whereas switches 71—71 and 72—72 are, for clearer illustration, shown as exterior to recording room 21, they are preferably positioned within said room and adjacent to levers 55 and 56. Also, that whereas the sound producing devices, as 69 and 70, are shown as exterior to said room, the sound to be recorded is suitably carried before microphone 29 or such other conveniently located similar instrument arranged to record said incidental sound in cameras 33, 34 and 35.

It is to be noted by the herein described improved system of synchronously recording action and sound on motion picture films, whereas the actors during the recording of the action may be in strained physical positions whereby their voices could not be simultaneously recorded to the best advantage, when the synchronized sound recording is accomplished by applicants system they are comfortably seated, whereby they may employ their voices to the best advantage.

It is also to be noted that by applicants novel system of synchronously recording sound and action, old productions which have been filmed and exhibited may have sound records synchronized therewith. In other words, may be vitalized, whereby re-exhibition thereof may be made for profit.

When producing single or separated positive prints for reproduction purposes, said films may be printed in part as more fully described in my co-pending applications for Letters Patent, Serial No. 172,756 filed Mar. 4, 1927 and Serial No. 236,980 filed Dec. 1, 1927.

Whereas only one microphone, as 29, has been shown in the sound recording room 21, a number of separately tuned microphones may be employed, as more fully described in my co-pending application for Letters Patent Serial No. 306,655 filed Sept. 16, 1928.

Whereas film 60 has been shown as having central station 61—61 comprising conducting strips, as 62 and 63, said stations and the control apparatus therefor for effecting operation of magnets 66 and 68 may be formed as more fully described in my co-pending application, Serial No. 172,756 filed Mar. 4, 1927.

Whereas projectors, as 26 and 27, have been shown as mechanically connected to sound recording cameras, as 33, 34 and 35 by shafts, as 50 and 52, said projectors and cameras may be electrically coupled together by a known form of electrical coupling, said coupling also acting as the mechanical filter between said projector and cameras, whereby filter 51 may be dispensed with.

It is to be noted, also, that in applicants improved system while the actors are rehearsing their lines into the microphone 29, the director, as 12, may also speak into said microphone and instruct the operator of the monitor room when the sound recording cameras, as 33, 34 and 35, are to be placed in operation for final recording of the sound to be synchronized with the action projected onto the screen 25 by a projector, as 26 or 27.

It is preferable to install a plurality of projectors, as 26 and 27, whereby one projector may be loaded, or threaded, with film while the other is in operation for synchronization purposes.

A suitable telephone system (not shown) is installed between the monitor room, 20, and the sound recording room, 21, whereby the director of said recording room may, if necessary, be in constant communication with the operator of said monitor room.

It is also to be noted that by employment of the herein described improved system for producing talking motion picture films, foreign languages may be more readily sound recorded for accompaniment to action pictures. It is preferred under such recording however that the actors appearing in the recorded action should speak their lines in the foreign language selected for sound recording whereby the sequence of lip and facial movements may be substantially the same as if spoken by a person who may speak said selected language fluently. After the action picture has been recorded by American actors speaking the selected language to the best of their ability, foreign actors, or suitable persons who are able to speak the selected language fluently are placed before microphone 29, and after suitable rehearsals of their lines to the accompaniment of the American action projected onto screen 25, said selected foreign lines are recorded by cameras, as 33, 34 and 35 as hereintofore more fully described.

Whereas gears 42—42 are shown as being actuated by magnets, as 46 and 47, said gears may be manually caused to mesh with gears 41—41, depending upon which projector, as 26 or 27, is to be employed for projection of the action film, and a single magnet, as 46 or 47, may be arranged to operate a clutch, as 90 connected between sound recording camera 33 and the coupling, as shafts 50 and 52, interposed between said camera and said projectors, lever 91 acting to operate said clutch through rod 44 actuated by said single magnet.

What I claim is:—

1. In a system for recording sound motion picture records, an acoustically formed recording enclosure having a motion picture screen positioned therein, a plurality of motion picture projectors positioned exteriorally of the enclosure arranged to project motion pictures thereinto onto the screen, a microphone positioned within the enclosure for receiving the sound produced to the accompaniment of the projected motion pictures, a sound recording device positioned exteriorally of the enclosure having an energized circuit connected to the microphone arranged to record the sound received thereby, and means for selectively operatively connecting the projectors and the recording device for effecting synchronous operation thereof.

2. The system for producing sound motion picture records comprising, a sound recording enclosure having one or more sound recording devices therein, an acoustically formed enclosure having a sound responsive device therein, the sound producing enclosure being formed independently of the recording enclosure, means electrically connecting the recording devices and the responsive device arranged to render the recording device effective to record the sound received by the responsive device, means for driving the sound recording device normally rendered ineffective to drive the device, and means operated at will positioned in the sound producing enclosure arranged by operation thereof to render the driving means effective to drive the recording device.

3. The system for producing sound motion picture records comprising, a plurality of motion picture projectors, a sound recording device, a plurality of normally inoperative sound producing devices, and means for selectively operatively connecting the projectors and the recording device and selectively rendering the sound producing devices operative to produce sound.

4. The system for producing sound motion picture records comprising, an acoustically formed chamber having a motion picture screen therein, a motion picture projector arranged to advance motion picture film for projecting motion pictures onto the screen, a sound recording device, a sound responsive device in the chamber arranged to receive sound produced to the accompaniment of the projected pictures, means electrically connecting the recording device and the responsive device for rendering the recording device effective to record the sound received by the responsive device, means operatively connecting the projector and the recording device for effecting synchronous operation thereof, sound producing devices for producing sound within the chamber to the accompaniment of the projected pictures, the sound being directed into the responsive device, and means controlled by the advancement of the film by the projector for rendering the sound producing devices effective to produce sound at predetermined intervals of time during the projection of the pictures by the projector.

OSCAR A. ROSS.